March 17, 1970     A. H. CAMERON     3,500,743
PRODUCTION OF SKINLESS SAUSAGE
Filed Jan. 27, 1967     2 Sheets-Sheet 1

INVENTOR.
ANDREW H. CAMERON
BY William G. Hopley
AGENT

March 17, 1970  A. H. CAMERON  3,500,743
PRODUCTION OF SKINLESS SAUSAGE
Filed Jan. 27, 1967  2 Sheets-Sheet 2

INVENTOR.
ANDREW H. CAMERON
BY William J. Hopley
AGENT

United States Patent Office 3,500,743
Patented Mar. 17, 1970

3,500,743
PRODUCTION OF SKINLESS SAUSAGE
Andrew Hepburn Cameron, Weston, Ontario, Canada, assignor to Union Carbide Canada Limited, Toronto, Ontario, Canada, a Canadian company
Filed Jan. 27, 1967, Ser. No. 612,233
Int. Cl. A22c 11/00
U.S. Cl. 99—353                                     12 Claims

ABSTRACT OF THE DISCLOSURE

An apparatus and process for producing skinless sausages from a continuous cellulose sheath stuffed with meat. Two endless conveyors are positioned on opposite sides of the path of travel of the cellulose sheath. Each conveyor has projecting members on the opposite conveyor to pinch off the sheath along predetermined lengths of its path. A heating means is positioned in the path for coagulating the protein in the outer surface of the sausages after pinching off, and a cooling means is positioned downstream of the heating means for cooling the surface layer of the sausages to set the coagulated protein. A means is provided downstream of the cooling means for stripping the sheath from the sausages.

BACKGROUND OF THE INVENTION

Field of the invention

This invention relates to the production of fresh skinless sausages, that is, sausages which do not have a casing enclosing the meat formulation and which have not been cooked prior to reaching the consumer.

DESCRIPTION OF THE PRIOR ART

In the past, fresh sausages have been prepared by emulsifying the desired formulation of meats and encasing the formulation in an animal-derived casing, usually intestine. The shelf-life of fresh sausages has been short because of the high potential for bacterial growth which exists in an animal encased product, both the animal casing and the sausage means being susceptible to rapid deterioration. Because of this susceptibility to deterioration and the case which is required in handling and storing such sausages to minimize it, it has been very difficult to provide at the consumer level a product which can be considered truly fresh. Very often, at least partial deterioration of the sausages has occurred before consumption. Regenerated cellulose casings such as that available under the trademark "Nojax" have been substituted for the animal casing, but in this case the cellulose casing is removed from the sausage prior to marketing. Using cellulose casing in this manner eliminates the bacterial deterioration caused by animal casing and thus increases the shelf-life of the sausage.

Previous methods for producing fresh skinless sausages have produced a rough sausage surface which resulted in sticking of the sausage surface to a like surface or to the surface of containers such as cooking utensils. This tendency to stick often caused destruction of the new sausages. Furthermore, present-day methods for producing skinless sausages have been complicated, troublesome and costly to the processor, and the production of skinless sausages which are as capable as encased sausages of withstanding normal handling during packaging and shipping has proven very difficult. As a result, there has been a long felt need for an improved process for the production of fresh skinless sausages and for fresh skinless sausages with a satisfactory shelf-life and with good handling and cooking characteristics. Sausage processors have been looking for apparatus which will provide continuous straight-line production of satisfactory fresh skinless sausages with a minimum of equipment and at a cost comparable to or below the cost of production of animal-encased sausages.

SUMMARY OF THE INVENTION

One object of the present invention is to provide a process for producing skinless sausages with improved handling and cooking characteristics.

A further object of this invention is to provide apparatus adapted to carry out the aforementioned process.

Accordingly, this invention provides an apparatus for producing skinless sausages from a continuous, tubular, regenerated cellulose sheath which has been stuffed with a sausage formulation having meat as one constituent, said apparatus comprising: linking means for pinching off the stuffed sheath at intervals into linked sausages and for positively conveying them over a predetermined path, heating means in said path for heating the outer surface layer of the linked sausages to a temperature sufficient to coagulate the protein in said outer surface layer, cooking means in said path downstream of said outer surface layer, cooling means in said path downstream of said heating means for cooling the surface layer of the linked sausages, thereby to set the coagulated protein and to prevent discolouration of said surface layer, and stripping means downstream of said path for stripping the sheath from the sausages.

This invention also provides a process for producing skinless sausages from a continuous, tubular, regenerated cellulose sheath which has been stuffed with a sausage formulation having meat as one constituent, said process comprising the steps: pinching off said sheath at intervals to form a series of linked sausages, exposing the linked sausages to a heating medium for a period of time sufficient to coagulate the protein in the meat at the outer surface layer of the sausages, immediately chilling the outer surface layer of the sausages to set the coagulated protein and to prevent discoloration of said surface layer, and stripping the sheath from the sausages.

The present invention is applicable to the production of sausages of widely varying formulations including those formulations normally used for skinless sausages. Sausages usually contain pork and/or beef, and they can comprise other meats such as lamb, veal, mutton, fish, fowl and combinations thereof. The term "meat" as used in this specification should be interpreted to include all of the foregoing. In addition, the sausage formulation can include spices, preservatives, etc. as is usual in sausages.

BRIEF DESCRIPTIOI OF THE DRAWING

One embodiment of the apparatus of this invention is shown in the accompanying drawings, in which like numerals denote like parts throughout the several views, and in which.

Figure 1:
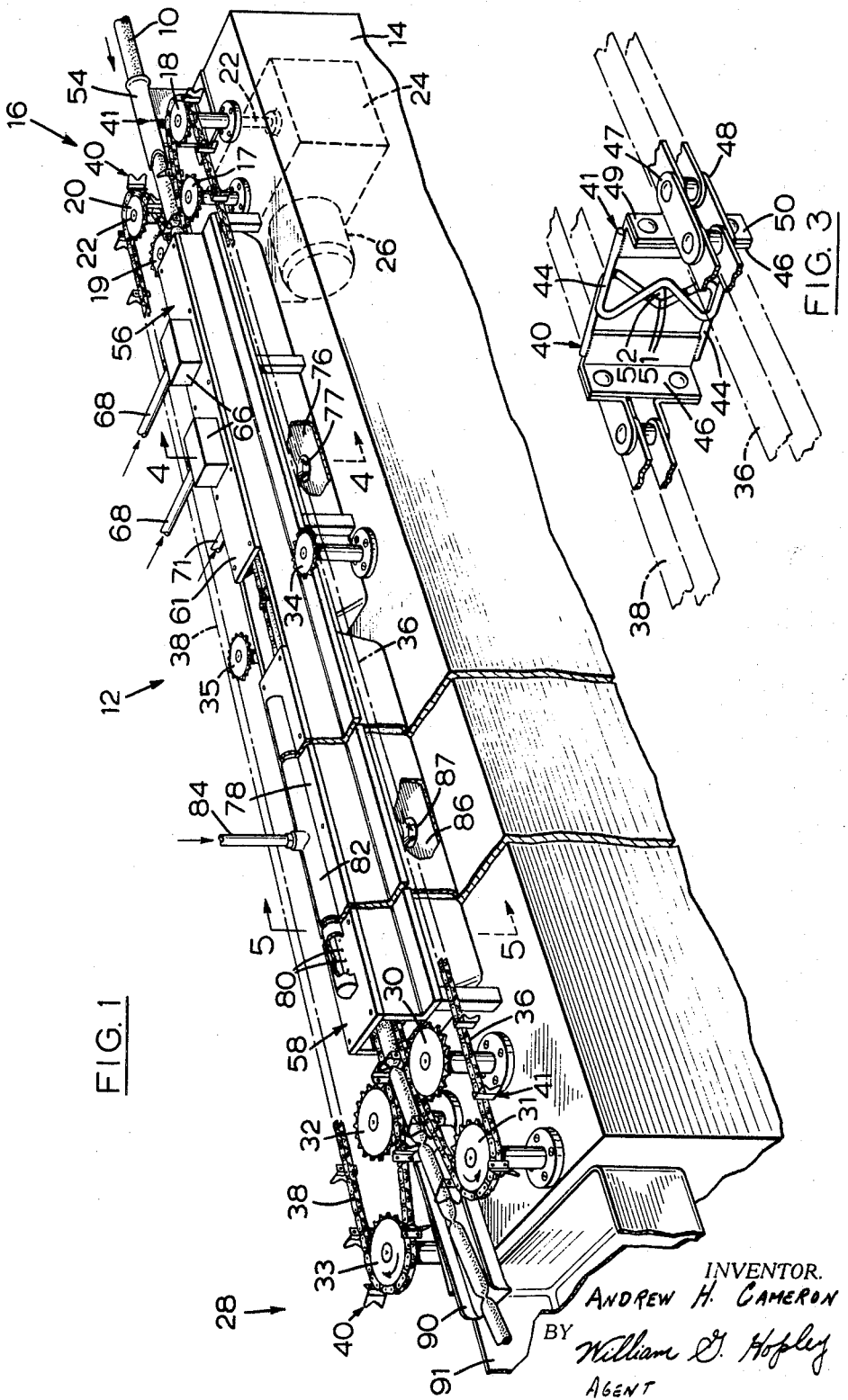
FIGURE 1 is a perspective, partly broken-away general assembly view of a portion of the apparatus of this invention.
Figure 4:
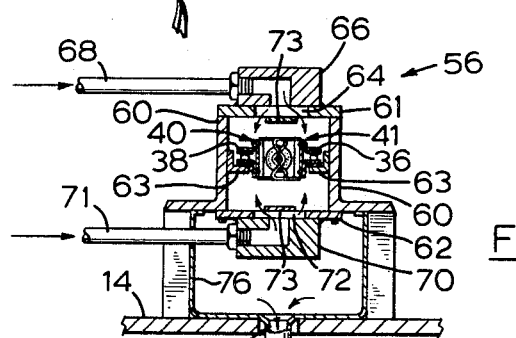

FIGURE 3 on the same drawing sheet as FIGURE 1, is a perspective view, to a larger scale, of one feature of the apparatus of this invention;

FIGURE 4 is a sectional view taken at the line 4—4 in FIGURE 1; and

Figure 5:
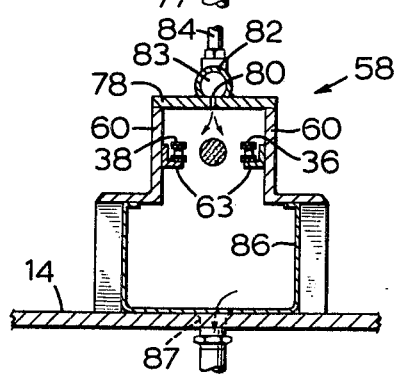

FIGURE 5 is a sectional view taken at the line 5—5 in FIGURE 1.

In the practice of this invention; the meats for the desired sausage formulation are emultified in a normal manner according the sausage-making pracitce, and the other ingredients of the formulation are added. Prior to actual sausage-making the resultant emulsion is usually cold, about 28° to 32° F. The emulsion is stuffed in a conventional manner into a regenerated cellulose casing of the type commonly used for skinless sausages. The diameter of the casing and of the resultant sausage can be chosen to suit the processor. The stuffing apparatus is well known per se, and has not been shown in the drawings.

Turning now to FIGURE 1, the regenerated cellulose casing or sheath 10 stuffed with the meat emulsion is passed continuously to a linking apparatus shown generally at 12. The linking apparatus 12 continuously pinches off the stuffed sheath into linked sausages and positively conveys them over a predetermined path. The pinching-off of the sheath 10 occurs at evenly spaced intervals so that the meat emulsion within will be divided into separate sausages of the same length. The sheath 10 itself is not ruptured or broken in the linking operation, and therefore the separate sausages remain joined to one another.

The linking apparatus 12 includes an elongated mounting table 14 to which a number of sprockets are mounted as follows: at the right-hand or upstream end 16 are four sprockets 17, 18, 19 and 20 of which sprockets 18 and 20 are mounted to be positively rotated at the same speed on shafts 22 through a conventional transmission 24 by a motor 26. Sprocket 18 is rotated counter-clockwise as seen from above, while sprocket 20 is rotated in the opposite direction. All of the sprockets are mounted for rotation in the same horizontal plane, and all of the sprockets except for sprockets 18 and 20 are mounted for free rotation. At the left-hand or downstream end 28 of the linking apparatus 12 are four sprockets 30, 31, 32 and 33, all mounted to the table 14 for free rotation. Intermediate the upstream end 16 and the downstream end 28 are two freely-rotating sprockets 34 and 35.

A first endless chain 36 is strung around sprockets 18, 17, 30, 31 and 34, and a second endless chain 38 is strung around sprockets 20, 19, 32, 33 and 35. As will be apparent, the positive rotation of the driven sprockets 18 and 20 causes the endless chains 36 and 38 to progress such that a given chain link will encounter the sprockets in the order given in the preceding sentence. Some of the individual chain links have been omitted for simplicity of illustration. The "inside runs" of the chains, i.e. between sprockets 17 and 30 and between sprockets 19 and 32 are parallel, as are the "outside runs" of the chains, i.e. between the sprockets 31 and 18 and between sprockets 33 and 20, although the outside runs need not necessarily be parallel. The inside runs define the predetermined path, mentioned above, over which the linked sausages are positively conveyed. At the upstream end 16, the sprockets 18 and 20 are spaced further apart than the sprockets 17 and 19, and at the downstream end 28, the sprockets 31 and 33 are likewise spaced further apart than the sprockets 30 and 32. The effect of this spacing is that the endless chains 36 and 38 converge towards each other as they approach sprockets 17 and 19, and diverge away from each other as they move away from sprockets 30 and 32.

Each chain 36 and 38 carries a plurality of identical V-groove knuckles spaced therealong at intervals corresponding to the desired length of the individual sausages. The chains 36 and 38 are synchronized such that pairs of knuckles meet and remain together over the "inner run." For example, the pair of knuckles 40, 41 are about to meet and converge at the upstream end 16 of the linking apparatus 12.

FIGURE 3 shows the pair of knuckles 40, 41 in their orientation within the "inner run." Each knuckle consists of a length of stiff piano wire 44 bent into the shape of the Greek capital sigma, $\Sigma$, and secured at its free ends to an angle-plate 46, for example by welding. The angle plate 46 is in turn attached to plates 47 and 48 of a single chain link by means of rivets through up and down-turned tabs 49 and 50 integral with the plates 47 and 48 respectively. Piano wire of ⅛" diameter has been found to be satisfactory for the knuckles.

Within the "inner run," pairs of knuckles are spaced apart such that, as shown in FIGURE 3, the bases 51 of the V-grooves in the piano wire 44 define a small aperture 52.

An open-ended cylindrical horn 54 receives the stuffed sheath 10 from the stuffing apparatus (not shown) and directs it along a line midway between the portions of chains 36 and 38 traversing the "inner run." In this way, the converging pairs of knuckles at the upstream end of the linking apparatus 12 gradually pinch off the sheath into a series of separate sausages held together by the sheath, which is bunched together without rupturing to pass through the apertures 52 defined between pairs of knuckles along the inner run.

The "inner run" is almost totally enclosed by two conduits: a first conduit 56 near the upstream end of the inner run and a second conduit 58 near the downstream end of the inner run. The first conduit 56 constitutes part of heating means adapted to heat the outer surface layer of the linked sausages to a temperature sufficient to coagulate the protein in the outer surface layer. The heating means will now be fully described with reference to FIGURE 4. The conduit 56 is defined by angle bars 60, an upper plate 61 and a lower plate 62. The angle bars 60 run the entire length of both conduits 56 and 58 (as seen in FIGURE 1). Small L-bars 63 are secured to the inner faces of the angle bars 60, and serve to support the chains 36 and 38 laterally and vertically. The pair of knuckles 40, 41 is shown in FIGURE 4. Two openings 64 are located in the upper plate 61 (only one seen in FIGURE 4), and over each is secured a steam distribution block 66 having passages whereby steam can pass from low pressure steam pipes 68 (about 10 to 12 p.s.i.g.) into the conduit 56 through the openings 64. Similar steam distribution blocks 70 are located beneath the conduit 56 as shown, and deliver steam from steam pipes 71 through openings 72 into the conduit 56. Plates 73 are provided to partly cover the openings 64 and 72 and these serve to spread the steam entering the conduit 56. Drainage apertures (not shown) are provided in the plate 62 to permit condensate to collect in a trough 76 of suitable material. A drain 77 removes the condensate from the trough 76.

The second conduit 58 consitutes part of cooking means adapted to cool and "set" the heated and congealed surface layer of the sausages, thereby to prevent discoloration of the surface layer. The cooling means will not be described with reference to FIGURE 5. The conduit 58 is open-bottomed but is closed at the top by a cover plate 78 which has a row of apertures 80 down its centre line. Enclosing the apertures 80 is a split pipe 82 defining a chamber 83 from which the apertures 80 provide egress. The split pipe 82 has closed ends. A brine feed-pipe 84 leads from a brine storage and refrigeration unit of conventional type (not shown) and is connected into the top of the split pipe 82 at about its midpoint. Brine at the temperature below about 28° F. and possibly down to about 10° F. is delivered through the feed-pipe 84 into the chamber 83, from which the apertures 80 distribute the brine onto the upper side of the linked sausages passing along the conduit 58. The brine then drops down into a trough 86 separate from the trough 76, and a drain 87 removes the brine therefrom.

The plates 61 and 78 are spaced from one another to permit the steam to escape from conduit 56 without entering conduit 58.

Figure 2:
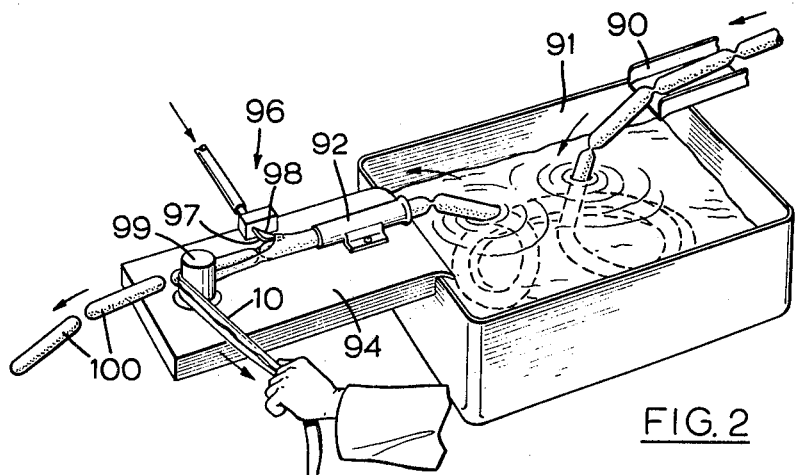
FIGURE 2 is a perspective view of the remainder of the apparatus of this invention.

At the downstream end 28 of the linking apparatus 12, the pairs of knuckles diverge and free the sausages, which pass through a chute 90 into a reservoir 91 of which only a part is shown in FIGURE 1. FIGURE 2 shows the whole reservoir 91, which is filled with cold brine or some other suitable liquid at about 10° F. The linked sausages, still within the sheath 10 but existing as discreet items, pass into the reservoir 91 and remain therein a certain length of time after which they are withdrawn therefrom to be removed from the sheath. The reservoir 91 is not absolutely necessary and could probably be eliminated if it were certain that no delay in subsequent processing steps would occur, since such a delay would cause the sausage temperature to rise to that of the ambience, making the meat softer and more difficult to handle in the subsequent steps. Delays cannot always be eliminated, however, and the provision of reservoir 91 eliminates the risk of a temperature rise in the meat. The reservoir 91 is also useful in bringing the entire sausage to a uniform temperature throughout.

After the sausages have been immersed in the reservoir 91, they are withdrawn therefrom and are made to pass through a cylindrical horn 92 attached to a plate 94 downstream of the reservoir. The horn 92 directs the still-encased sausages to a casing slitter 96 which utilizes pressurized air delivered through a tube or tubes 97 to expand the casing away from the sausage, and a knife edge 98 to slit the expanded casing. The casing slitter 96 is of a conventional type and need not be dealt with in detail here. One such casing slitter is described in U.S. Patent Number 2,725,591, issued Dec. 6, 1955 to T. B. Cline et al. The casing 10, once slit, is looped around a freely rotating spindle 99 and is pulled by hand away from the now skinless sausages 100 as shown in FIGURE 2. The freed sausages 100 pass on to the packaging operation.

The endless chains 36 and 38 travel at constant speed, and thus the dwell times for a given sausage in the conduits 56 and 58 will be in the same ratio as the lengths of these conduits. Since it is desirable that the coagulated protein surface be produced without discernible discoloration of the meat, the dwell time of the sausage in the steam conduit 56 should be as short as possible consistent with sufficient coagulation of the surface protein in the sausage. The optimum dwell time will vary for different meat formulations, but generally the dwell time is in the range from about 2 to about 7 seconds. The actual length of the conduit 56 will therefore be governed by the speed at which the sausage moves therealong and the desired dwell time. A convenient length for the steam conduit 56 has been found to be about 3 to 5 feet.

The dwell time of a sausage in the cooling conduit 58 should be sufficient to "set" the coagulated surface protein so that when the casing is removed the sausage will retain its separate shape and will have enough surface strength to withstand subsequent handling. The dwell time in the cooling conduit 58 is proportional to the dwell time in the steam tunnel (the longer the latter, the longer the former), and is also dependent upon the temperature of the chilling medium and the manner in which the sausage is exposed to the chilling medium. Where a brine spray is utilized, the necessary dwell time in conduit 58 has been found to be between about 4 and about 15 seconds.

In view of the dwell times set out in the above paragraphs and in the following examples, it will be clear that the brine conduit 58 will usually be somewhat longer than the steam conduit 56. In FIGURE 1, the mounting table and the brine conduit 58 have been broken at two places in order to avoid needlessly showing the greater length of the brine conduit 58.

The parameters of the various steps in the process can be varied to suit the meat formulation being utilized, depending both on the kind of meat and its particular composition. For example, some pork has a greater fat content than other pork. In addition, the meat for the sausage formulation can be either fresh or previously frozen, although all frozen meat must be thawed first. The dwell times for the various steps can be varied so as to be suitable for fresh or previously frozen meats. In general, the dwell time in the steam conduit 56 for previously frozen meats will be longer than for fresh meats, because freezing is accompanied by some change in the meat which lengthens the time necessary for coagulation.

Instead of steam, the heating medium employed in the conduit 56 could be hot water or other liquid. The dwell time in the conduit 56 in this case would likely have to be lengthened, although this would depend upon the temperature of the water or liquid. It is believed that heating the sausage by infra-red radiation would be attended by too many difficulties to be practicable, although it is possible that with improved techniques this method of heating could be utilized.

DESCRIPTION OF THE PREFERRED EMBODIMENTS

The following specific examples of the production of fresh skinless sausage according to this invention are included to illustrate the various steps in the process.

EXAMPLE 1

Boneless picnic meat (pork)—10 lbs.
Neck fat—10 lbs.
Belly trimmings—20 lbs.
Crushed ice—8 lbs.
Biscrumb (a grain cereal having at least 80% dextrose)— 3 lbs.
Salt—1 lb.
Pepper—2½ oz.
Mace—1 oz.
Nutmeg—¼ oz.
Monosodium glutamate—½ oz.

A sausage filling of the above formulation was chopped and emulsified in a manner normal to meat processing practices. The ice, cereal, salt, and spices were added to give the sausage the desired flavour and texture. The fat content of the resultant emulsion was about 34%, and the temperature of the emulsion was held at 30° F. The finished emulsion was stuffed into 24/32 Nojax (trademark) regenerated cellulose casing to a diameter of 21 mm. The stuffed casing then was passed into linking apparatus and conveyed through a steam tunnel. The steam tunnel was 22 inches long, 4¼ inches wide and 2 inches deep, and contained an atmosphere of steam supplied by a steam boiler at 10 pounds pressure. The time required for the sausage to pass through the steam atmosphere was 4 seconds.

The sausage then entered a chill tunnel and was subjected to a spray of 10° F. brine to give immediate chill to the sausage. The chill tunnel was 48 inches long and the travel time was 9 seconds. At this point, the sausage was released from the linking apparatus and deposited into a tank containing liquid brine at a temperature of about 10° F. A complete strand of sausage about 20 feet long was released into the brine tank before the casing stripping operation took place.

From the brine tank the sausage then was passed through a casing stripping device, which removed the cellulose casing from the sausage. After passing through the casing stripping operation, the sausage was packaged.

EXAMPLE 2

Boneless picnic meat (pork)—18 lbs.
Neck fat—22 lbs.
Biscrumb—2½ lbs.
Crushed ice—8 lbs.
Salt—1 lb.
Pepper—2½ oz.
Mace—1 oz.
Nutmeg—¼ oz.
Monosodium glutamate—½ oz.

A sausage filling of the above formulation was emulsified by the same procedure as in Example 1. The fat content of this emulsion was about 31%. The steps of Example 1 were repeated with a dwell time in the steam tunnel of 5 seconds and a dwell time in the chill tunnel of 12 seconds. The dwell time in the brine tank was about 1½ minutes.

EXAMPLE 3

Boneless sow shoulder meat—20 lbs.
Sow belly trimmings—10 lbs.
Pork neck fat—10 lbs.
Ice (crushed)—8 lbs.
Salt—1 lb.
Pepper—2½ oz.
Mace—1 oz.
Nutmeg—1 oz.
Monosodium glutamate—½ oz.

A sausage filling of the above formulation was emulsified by the same procedure as in Example 1. The fat content of the emulsion was about 32%. In this example the dwell time in the steam tunnel was about 3 seconds, and the dwell time in the chill tunnel was about 7 seconds. Dwell time in the brine tank was increased to about 2½ minutes to facilitate removal of the casing in the stripping operation.

The variation in dwell times in the examples was necessitated by the variation in raw meat materials contained in the different formulations. In general, the greater the lean meat content, the shorter the dwell time in the steam conduit 56 necessary to coagulate the proteins in the surface layer. In each of the examples the sausage produced had a relatively smooth surface provided by the coagulation of the proteins in the outermost surface layer of the meat. The surface proved much easier to handle than the relatively rough uncoagulated surface of normal fresh skinless sausage produced without the benefit of this invention. Specifically, it was found that the smooth surface of the sausages did not stick to a frying pan as did the rough surface of such normal fresh skinless sausage. In addition, when sausage having an uncoagulated surface is thawed from a frozen state the individual sausages tend to stick together, whereas this tendency is practically eliminated in sausages produced in accordance with this invention.

I claim:

1. Apparatus for producing skinless sausages from a continuous, tubular, regenerated cellulose sheath which has been stuffed with a sausage formulation having meat as one constituent, said apparatus comprising:
   linking means for pinching off the stuffed sheath at intervals into linked sausages and for positively conveying them over a predetermined path,
   heating means in said path for heating the outer surface layer of the linked sausages to a temperature sufficient to coagulate the protein in said outer surface layer,
   cooling means in said path downstream of said heating means for cooling the surface layer of the linked sausages, thereby to set the coagulated protein and to prevent discoloration of said surface layer,
   and stripping means downstream of said path for stripping the sheath from the sausages.

2. Apparatus as claimed in claim 1, in which a cooling reservoir containing a cold liquid is positioned downstream of said cooling means and upstream of said stripping means, the cooling reservoir being adapted to receive linked sausages proceeding from said cooling means, the linked sausages being continuously immersed in and removed from said cold liquid.

3. Apparatus as claimed in claim 1, in which the linking means comprises two endless conveyors mounted on opposite sides of said path, each endless conveyor being positioned with a portion thereof adjacent the path, the portions being in spaced parallel relation, each endless conveyor carrying at spaced intervals therealong projecting members adapted to register in pairs along said path, each registering pair pinching off said sheath and thereby dividing the sausage formulation within the sheath into discrete sausages.

4. Apparatus as claimed in claim 3, in which each projecting member is shaped to have a V-groove opening outwardly, the V-grooves of registering pairs of projecting members overlapping but leaving an opening defined by the apices of the V-grooves of each registering pair, said opening being large enough to accommodate the pinched-off sheath without rupture.

5. Apparatus as claimed in claim 4 in which each projecting member comprises of a stiff wire bent to define said V-groove.

6. Apparatus as claimed in claim 3, in which the endless conveyors are endless chains mounted on sprockets to move along substantially coplanar, closed circuits, and in which each projecting member comprises a stiff wire bent to define a V-groove opening away from the chain and outwardly of its closed circuit, said stiff wire at the extremities of the V-groove being bent back toward the chain and being rigidly secured to one link thereof, the V-grooves of registering pairs of projecting members overlapping but leaving an opening defined by the apices of the V-grooves of each registering pair, said opening being large enough to accommodate the pinched-off sheath without rupture.

7. Apparatus as claimed in claim 6, in which the heating means comprises an open-ended heating conduit encompassing part of said portions adjacent said path, and means for introducing steam into said heating conduit, and in which the cooling means comprises a cooling conduit encompassing part of said portions adjacent said path, said cooling conduit having means for spraying onto the surface of the linked sausages brine at a temperature between about 10° F. and about 28° F., the heating conduit and the cooling conduit being spaced from each other longitudinally.

8. Apparatus as claimed in claim 7, in which a cooling reservoir containing brine at about 10° F. is positioned intermediate said cooling means and said stripping means, the cooling reservoir being adapted to receive linked sausages proceeding from said cooling means, such that the linked sausages can be continuously immersed in and removed from said cold liquid.

9. Apparatus as claimed in claim 3, in which the heating means comprises an open-ended heating conduit encompassing part of said portions adjacent said path, and means for introducing into said heating conduit a fluid heating medium capable of heating the outer surface layer of the linked sausages to a temperature sufficient to coagulate the protein in said outer surface layer.

10. Apparatus as claimed in claim 9, in which the heating medium is steam.

11. Apparatus as claimed in claim 3, in which the cooling means comprises a cooling conduit encompassing part of said portions adjacent said path, said cooling conduit having means for spraying a liquid cooling medium onto the surface of the linked sausages.

12. Apparatus as claimed in claim 11, in which the cooling medium is brine at a temperature between about 10° F. and about 28° F.

References Cited

UNITED STATES PATENTS

| | | | |
|---|---|---|---|
| 2,542,673 | 2/1951 | Hedwall | 99—353 X |
| 2,675,753 | 4/1954 | Eber | 99—353 |
| 2,789,914 | 4/1957 | Davis | 99—261 |
| 3,223,530 | 12/1965 | Weprin | 17—34 |
| 3,408,687 | 11/1968 | Amundson | 17—34 |

ROBERT W. JENKINS, Primary Examiner

U.S. Cl. X.R.

17—34; 99—109